United States Patent

(12) United States Patent
In

(10) Patent No.: US 7,975,538 B2
(45) Date of Patent: Jul. 12, 2011

(54) AGING DEVICE FOR CATALYTIC CONVERTER IN VEHICLE AND METHOD THEREOF

(75) Inventor: Chibum In, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 342 days.

(21) Appl. No.: 12/255,904

(22) Filed: Oct. 22, 2008

(65) Prior Publication Data
US 2009/0151336 A1  Jun. 18, 2009

(30) Foreign Application Priority Data

Dec. 14, 2007 (KR) ................ 10-2007-0131621

(51) Int. Cl.
G01M 15/10 (2006.01)
(52) U.S. Cl. ................................. 73/114.75
(58) Field of Classification Search ........... 73/114.69, 73/114.71, 114.75, 116.04, 118.01, 118.02
See application file for complete search history.

(56) References Cited

U.S. PATENT DOCUMENTS

| | | | | | |
|---|---|---|---|---|---|
| 5,938,715 | A | * | 8/1999 | Zhang et al. | 701/109 |
| 6,145,302 | A | * | 11/2000 | Zhang et al. | 60/274 |
| 7,347,086 | B2 | * | 3/2008 | Webb et al. | 73/29.01 |
| 2004/0025580 | A1 | * | 2/2004 | Webb et al. | 73/118.1 |
| 2004/0028588 | A1 | * | 2/2004 | Webb et al. | 423/213.2 |
| 2005/0039524 | A1 | * | 2/2005 | Ingalls et al. | 73/117.1 |
| 2007/0283749 | A1 | * | 12/2007 | Webb et al. | 73/118.2 |
| 2010/0011744 | A1 | * | 1/2010 | Dietl et al. | 60/277 |
| 2010/0242454 | A1 | * | 9/2010 | Holderbaum | 60/301 |

* cited by examiner

Primary Examiner — Eric S McCall
(74) Attorney, Agent, or Firm — Morgan, Lewis & Bockius LLP

(57) ABSTRACT

An aging device of a catalytic converter of a vehicle simulates wear-and-tear of a catalytic converter under conditions that simulate to those of a real vehicle by injecting an oil additive or an engine oil mixture containing phosphor (P), zinc (Zn), and etc., into an engine.

28 Claims, 2 Drawing Sheets

AGING DEVICE FOR CATALYTIC CONVERTER IN VEHICLE AND METHOD THEREOF

CROSS-REFERENCE TO RELATED APPLICATION

This application claims priority to and the benefit of Korean Patent Application No. 10-2007-0131621 filed in the Korean Intellectual Property Office on Dec. 14, 2007, the entire contents of which are incorporated herein for all purposes by this reference.

BACKGROUND OF THE INVENTION

1. Field of the Invention

The present invention relates to an aging device of a catalytic converter of a vehicle and a method thereof, and more particularly to an aging device of a catalytic converter of a vehicle, and to a method thereof that ages the catalytic converter under real conditions of a vehicle by injecting an engine oil mixture with amounts of elements such as phosphor (P), zinc (Zn), and so on that are elevated and causing catalytic poisoning or contamination in aging, as well as using a heat aging process according to a prior art.

2. Description of Related Art

Generally, exhaust gas that is exhausted out of an engine flows through a catalytic converter that is disposed in a middle portion of an exhaust pipe and is purified therein, through a muffler to decreased noise, and expelled to the atmosphere through an exhaust tail pipe.

Regulation of exhaust gas has become severe in many advanced nations, and so the importance of the catalytic converter has increased. Particularly, the usable lifespan of the catalytic converter is prescribed according to the exhaust gas regulations, which means that characteristics of a catalytic converter are to be sustained according to the usable lifespan.

Generally, an experimental method of driving a real vehicle is used so as to test the usable lifespan of the catalytic converter.

However, since the usable lifespan of the catalytic converter is regulated to be as long as 160,000 Km under domestic Korean rules and to be as long as 120,000 miles under North American rules, great time and expense are required when testing the lifespan of the catalytic converter by driving a real vehicle, and so there are many difficulties in actual application of such tests.

Accordingly, deterioration data that approaches that of actual driving conditions of a real vehicle can be determined through aging of the catalytic converter in bench tests of an engine that can mimic a state of a real vehicle.

However, the aging method that has been used until now in bench tests of an engine uses heat, and only uses the temperature of the catalytic converter for deteriorating the catalytic converter.

Likewise, the deterioration method of that catalytic converter that is used at present only uses heat, so there are many problems.

That is, the total amount of engine oil that is consumed increases as the operation period time is lengthened so consumption of phosphor (P) that is included in the engine oil increases, and this material poisons the catalytic converter and deteriorates the activation of the catalytic converter.

Accordingly, the catalytic poisoning or contamination by consumption of substances that are included in the engine oil in the thermal deterioration method that is used at present cannot be reflected, so there is a problem to insure reliable deterioration data.

Also, as regulation of exhaust gas become stricter, the catalytic converter is being located closer to the engine, thereby the development direction of the catalytic converter is to endure high temperatures, and there is a problem that catalytic poisoning or contamination by substances that are included in the engine oil becomes larger and larger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to an aging device of a catalytic converter of a vehicle includes an engine for bench testing, a first valve through which an oil additive or an engine oil mixture is injected into the engine, the first valve disposed in an intake line through which intake air flows, a pump that pressurizes and transmits the oil additive or the engine oil mixture from a storage tank to the first valve, a catalytic converter that is disposed in an exhaust pipe through which exhaust gas that is combusted in the engine is exhausted out of the engine, a second valve through which atmospheric air is introduced so as to produce a secondary combustion of unburned exhaust gas, the second valve disposed in the exhaust pipe upstream of the catalytic converter, and/or a control apparatus that operates thermal and contamination aging of the catalytic converter in a bench test state of the engine under conditions that simulates the operational state of a vehicle.

The control apparatus simultaneously performs the thermal and contamination aging so as to age the catalytic converter under conditions that are simulate those of a real vehicle by supplying the intake line with a contamination material and controlling the engine under normal and severe conditions. The control apparatus supplies the intake line with a predetermined amount of contamination material by controlling supply pressure of a pump and opening the first valve, and supplies the catalytic converter with air by controlling opening of the second valve under a severe operating condition of the engine. The control apparatus supplies the intake line with a predetermined amount of contamination material through the first valve and holds the temperature of the catalytic converter to less than 900° C. for 60 seconds by operating the engine with an air/fuel ratio of approximately 17:1, drives the engine with an air/fuel ratio of approximately 14.7:1 and holds the temperature of the catalytic converter to higher than 900° C. for 20 seconds through combustion of the unburned exhaust gas by flowing air to the catalytic converter through the second valve, and repeatedly controls said performances for a predetermined period.

The engine oil mixture that is injected into the intake line through the first valve is a mixture of commercial engine oil in which amounts of phosphor and zinc are respectively about 1000 ppm, and an oil additive of ZDDP (zinc dialkyldithiophosphate) or ZDTP (zinc dithiophosphate) in which amounts of phosphor and zinc are greater than about 1000 ppm. An injection amount and a mixture ratio of the oil additive and the engine oil mixture injected into the intake line through the first valve are adjusted according to an exhaust amount thereof during bench testing. The oil additive injected into the intake line through the first valve includes zinc dialkyldithiophosphate (ZDDP) and/or zinc dithiophosphate (ZDTP) having amounts of phosphor and zinc, which amounts being higher than those of commercial engine oil. The amount of the oil additive or the amount of engine oil mixture that is injected into the intake line through the first valve, is based upon the amount of engine oil that is consumed according to a general operational state of a vehicle. Unburned exhaust gas may be combusted in the catalytic converter by air that is injected through the second valve to increase the temperature of the catalytic converter to simulate a severe operating condition of the engine. Normal operating conditions of the engine may provide a theoretical air/fuel ratio for normal combustion and severe operating conditions of the engine may provide a rich air/fuel ratio in which the amount of unburned exhaust gas is increased.

Another aspect of the present invention is directed to an aging device of a catalytic converter of a vehicle which includes an engine for bench testing. The aging device may further include a first valve that supplies an air-intake line with a contamination material, a catalytic converter disposed in an exhaust pipe through which exhaust gas flows from the engine, a second valve through which atmospheric air flows into the exhaust pipe upstream from the catalytic converter, a controller for controlling the engine, the first valve, and/or the second valve to perform thermal aging and contamination aging of the catalytic converter.

A pump that is operated by a control signal of the controller may pressurize and transmit a contamination material that is injected into the intake line through the first valve from a storage tank. A contamination material may be injected into the air-intake line through the first valve is ZDDP or ZDTP containing an amount of phosphor and/or zinc that is higher than in commercial engine oil. A contamination material may be injected into the intake line through the first valve including an engine oil mixture of a commercial engine oil and/or an oil additive. An amount and a mixture ratio of the contamination material may be based upon an exhaust amount of the engine, and the amount of the contamination material corresponds to an amount of contamination material in engine oil that may be consumed by a real vehicle. The controller may be configured to sustain the temperature of the catalytic converter lower than a base temperature by operating the engine under a first air/fuel ratio, to hold the temperature of the catalytic converter higher than the base temperature for a predetermined time period by providing a secondary air to the catalytic converter through the second valve such that the unburned gas combusts, to operate the engine under a second air/fuel ratio for another predetermined period, and to repeat above steps to perform an aging experiment.

Another aspect of the present invention is directed to a method for aging a catalytic converter of a vehicle, including a first process that injects contamination material into an engine to simulate aging of a catalytic converter, a second process that operates the engine under a first air/fuel ratio, a third process that holds the temperature of the catalytic converter lower than a base temperature for a predetermined period, a fourth process that operates the engine under a air/fuel ratio, a fifth process that holds a high temperature of the catalytic converter higher than the base temperature for another predetermined period by supplying air to the catalytic converter, and a sixth process that determines whether a predetermined period in an experiment has passed, and repeatedly operates the second, third and fourth processes when the predetermined period has not passed.

The contamination material that may be injected into the engine may be at least one of an oil additive or an engine oil mixture. The contamination material that may be injected into the engine may be an oil additive having an amount of phosphor and/or zinc that is higher than that of a commercial engine oil. The contamination material may be an engine oil mixture of which an engine oil and an oil additive are mixed in a predetermined ratio. The amount and mixture ratio of the contamination material that is injected into the engine may be determined based on an exhaust amount of the engine in the first process. The amount of the contamination material that is injected into the engine in the first process corresponds to an amount of engine oil that is typically consumed by a real vehicle. The first air/fuel ratio may be approximately 17.0:1. A first air/fuel ratio corresponds to a normal driving condition. The base temperature of the catalytic converter may be approximately 900° C. The second air/fuel ratio may be approximately 14.7:1. The second air/fuel ratio corresponds with a severe driving condition in which a rich fuel mixture is supplied to the engine. Air that is supplied to the catalytic converter reacts with unburned exhaust gas to combust inside the catalytic converter and increase the temperature of the catalytic converter to about 1015° C.

Another aspect of the present invention is directed to a method for aging a catalytic converter through an engine bench tests, the method including (a) a supplying process that supplies a contamination material through an intake line, the amount of contamination material based upon exhaust amount and durability of the engine, (b) an aging process that ages the catalytic converter for a predetermined period under normal driving conditions by operating the engine under a theoretical air/fuel ratio, and/or (c) an aging process that ages the catalytic converter for a predetermined period under severe driving conditions by operating the engine under a rich fuel condition, wherein the aging processes are repeatedly and alternatively performed under normal driving conditions and under severe driving conditions for a predetermined experimental period.

Utilizing the above devices and methods, proper data that is needed for developing a catalytic converter can be obtained by aging the catalytic converter considering the catalytic poisoning or contamination under conditions that are identical to a real-world vehicle conditions in bench tests of the engine in accordance with various aspects of the present invention. Also, a catalytic converter having suitable exhaust performance can be offered based thereon.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
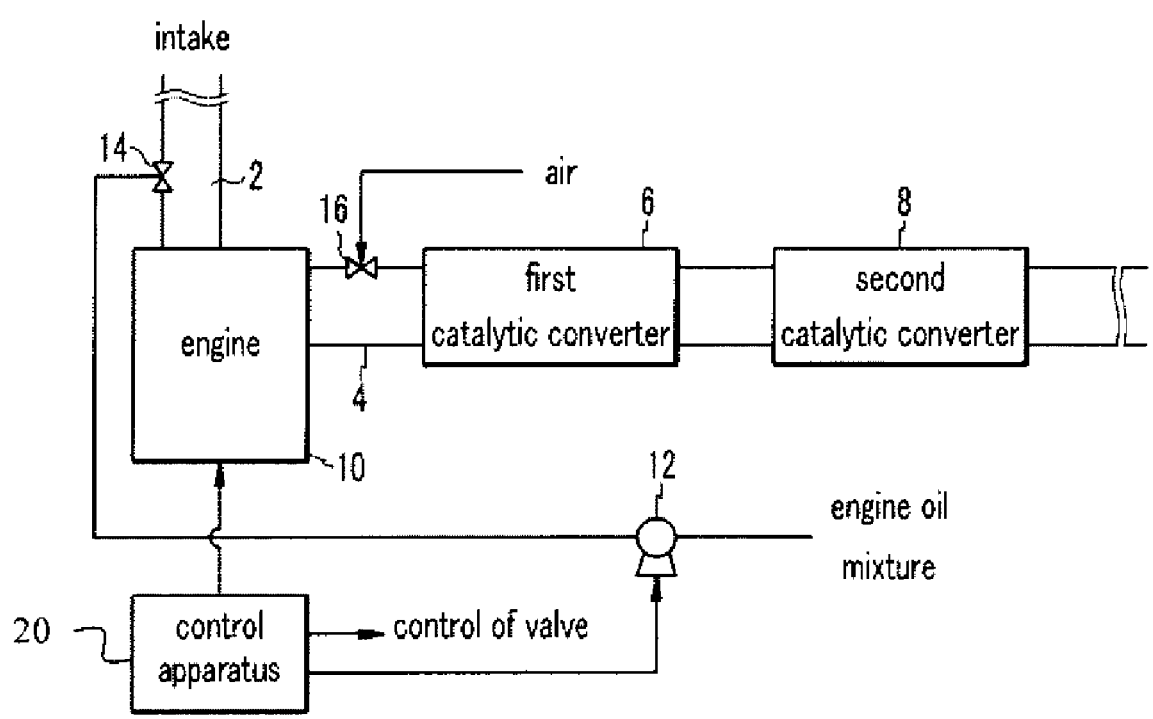
FIG. 1 is a diagram showing an aging device of a catalytic converter of a vehicle according to various aspects of the present invention.
Figure 2:
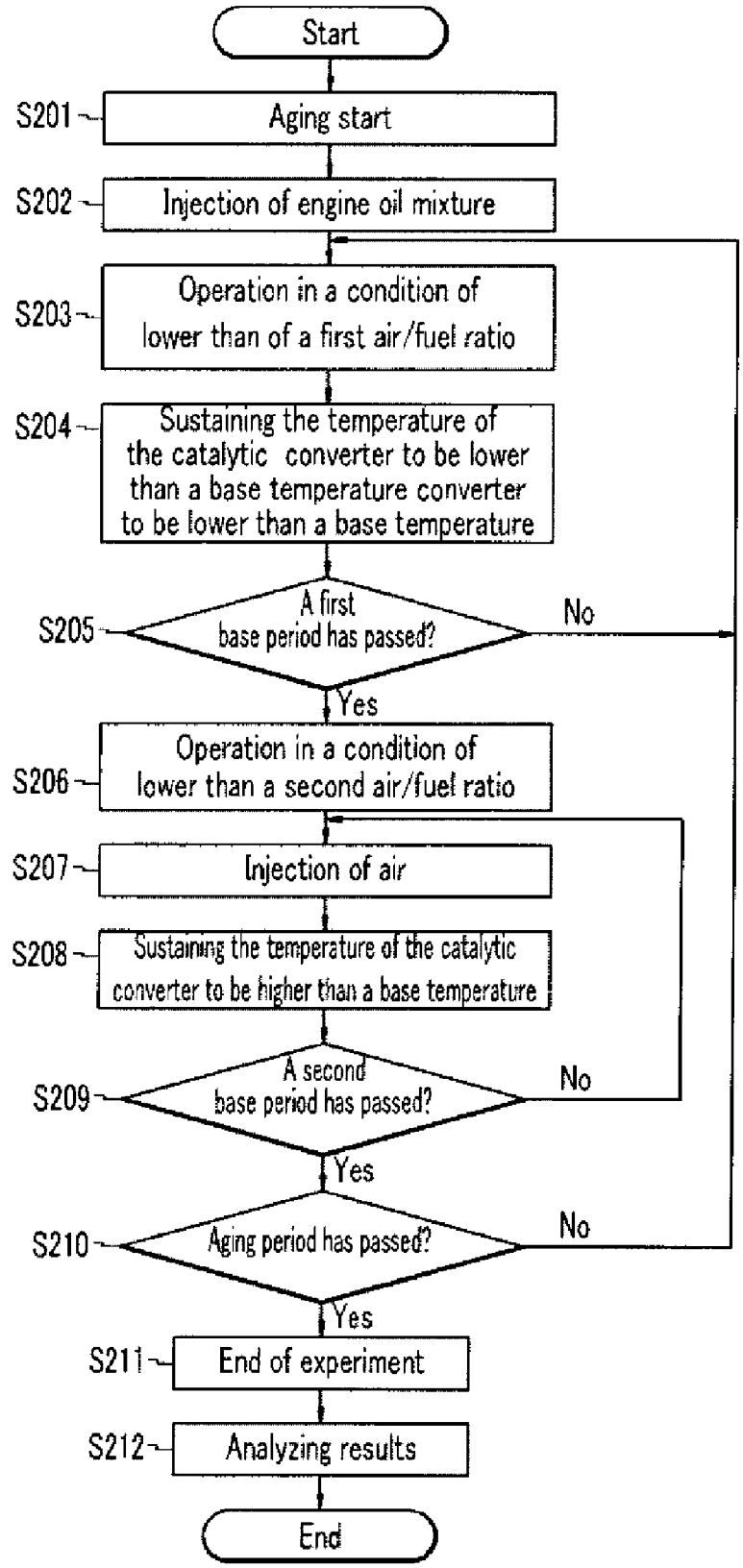
FIG. 2 is a flow chart showing an aging method of a catalytic converter according to various aspects of the present invention.

FIG. 1 is a diagram showing an aging device of a catalytic converter of a vehicle according to an exemplary embodiment of the present invention, and FIG. 2 is a flow chart showing an aging method of a catalytic converter according to an exemplary embodiment of the present invention.

As used herein, "bench test" engine may refer to either a real-world engine (e.g., in a vehicle) which is used for experimental and/or testing purposes, or a discrete engine in a laboratory, garage, R&D or other environment configured for experimental and/or testing purposes.

As shown, in bench tests of an engine 10, a first valve 14 that injects an oil additive or an engine oil mixture to an intake line 2 is disposed on the intake line 2. Inflow of atmospheric air to engine 10 is controlled in an otherwise conventional manner by a throttle valve to the engine 10. A first catalytic converter 6 and a second catalytic converter 8 are respectively disposed at positions of an exhaust pipe 4 that expels exhaust gas that is combusted in the engine 10 to the atmosphere in accordance with various aspects of the present invention.

A second valve 16 that inflows or introduces atmospheric air is disposed at an upstream side of the exhaust pipe 4 before the first catalytic converter 6.

The oil additive or engine oil mixture that is injected into the intake line 2 through the first valve 14 is pressurized and transferred from a storage tank or other suitable reservoir by a pump 12 that is operated by a control signal of a control apparatus 20.

The control apparatus 20 for bench testing controls aging of the first catalytic converter 6 and the second catalytic converter 8 to produce catalytic poisoning or contamination in a manner that is very similar to real-world vehicle wear-and-tear.

The control apparatus 20 may be configured to control the engine 10 under a normal condition such that combustion of a theoretical air/fuel ratio is performed for a predetermined uniform period so as to control the first catalytic converter 6 and the second catalytic converter 8 in the identical conditions to that of a real-world vehicle aging or wear-and-tear including corresponding catalytic poisoning or contamination. The control apparatus 20 may further control the engine 10 under a severe condition such that more unburned exhaust gas is expelled because of a rich air/fuel ratio for a predetermined uniform period, and repeats the above aging tests for a predetermined uniform period. One will appreciate that the control apparatus may be configured to alternate conditions, vary the time periods, and/or other parameters if so desired.

The engine oil mixture is made by mixing commercial engine oil in which the amount of phosphor (P) and zinc (Zn) may be approximately 1000 ppm, and an oil additive such as ZDDP (zinc dialkyldithiophosphate) or ZDTP (zinc dithiophosphate) and so on in which amount of phosphor (P) and zinc (Zn) is higher than that of the commercial engine oil.

Also, injection of the oil additive or the engine oil mixture in which the engine oil and the oil additive are mixed is controlled by a control signal of the control apparatus 20. Thusly, aging tests that reflect or mimic the catalytic poisoning or contamination by such injection through the first valve 14, which is disposed in the intake line 2, can trace deterioration of the catalytic converter under conditions similar to that of a real vehicle.

The injection of the oil additive or the engine oil mixture in which the engine oil and the oil additive are mixed may be as much as an amount of engine oil that is consumed by a real vehicle. Herein, it may be pressurized and transferred uniformly by the pump 12 by opening/closing the first valve 14 for a desired period.

The aging test in which the catalytic poisoning or contamination is reflected or replicated in the catalytic converter of the aging devices of the present invention including a function that is mentioned above is now explained in greater detail referring to FIG. 2.

As shown in FIG. 2, an aging mode starts (S201) under a condition in which the first catalytic converter 6 and the second catalytic converter 8 are disposed in the exhaust pipe 4 of the engine 10 in bench tests, and a control apparatus 20 opens the first valve 14 that is disposed in the intake line 2. Also, the control apparatus 20 causes ZDDP of which contents of phosphor (P) and zinc (Zn) are high, or an oil additive of a ZDTP material or an engine oil mixture in which the engine oil and the oil additive are mixed, to be pressurized and transferred through the pump 12 to the engine 10 through the intake line 2 (S202).

The mixing ratio and injection amount of the oil additive that is injected into the intake line 2 through the first valve 14 or the engine oil mixture in which the engine oil and the oil additive are mixed are adjusted according to the exhaust amount of the engine 10 that is performing the aging experiment.

In this process, the control apparatus 20 operates the engine 10 under a condition of lower than a first air/fuel ratio (S203), and sustains the temperature of the first catalytic converter 6 and the second catalytic converter 8 that are disposed in the exhaust pipe 4 to be lower than a base temperature for a first base period (S204).

The first air/fuel ratio is approximately 17.0:1, and the condition of lower than the first air/fuel ratio is a ratio of approximately 14.7:1.

Also, the base temperature is 900° C., the temperature condition of lower than the base temperature is around 780° C., and the first base period is about 60 sec.

As described above, operating of the engine 10 under a condition of lower than the first air/fuel ratio and sustaining the first catalytic converter 6 and the second catalytic converter 8 to be lower than the base temperature are combustion-controlled in a normal state in which a theoretical air/fuel ratio is sustained.

In the above control state, whether the predetermined first base period has passed or not is determined (S205).

If the first base period has not passed in the determination of step S205, it is returned to step S203, and if the first base period has passed, it operates the engine 10 under a lower condition than of a second air/fuel ratio (S206).

The lower condition than of the second air/fuel ratio is a driving condition under a ratio of approximately 14.7:1, which is a rich fuel condition of about 13:1.

As described above, secondary or supplemental air flows to the first catalytic converter 6 and the second catalytic converter 8 through the second valve 16 in a state in which the engine 10 is operated in the lower condition than of the second air/fuel ratio, and the unburned fuel exhausting from the engine 10 combusts by the secondary or supplemental air (S207) which raises the catalytic converters above the base temperatures.

Accordingly, because the unburned fuel combusts by the secondary air, the temperature of the first catalytic converter 6 and the second catalytic converter 8 becomes higher than the base temperature (S208).

The temperature of the first catalytic converter 6 and the second catalytic converter 8 may increase as high as 1015° C. by combustion of the secondary air, so the performance of the first catalytic converter 6 and the second catalytic converter 8 deteriorates, which state is representative of severe driving conditions.

It is then determined whether a period in which the temperature of the first catalytic converter 6 and the second catalytic converter 8 is sustained to be higher than the base temperature has passed a predetermined second base time (S209).

The second base time may be about 20 sec.

As described above, operating the engine 10 under a lower condition than of the second air/fuel ratio and sustaining the temperature of the first catalytic converter 6 and the second catalytic converter 8 to be higher than the base temperature by inflowing the secondary air are indicative of severe driving conditions.

If the predetermined second base period has not passed in the determination of step S209, it is returned to step S207, and if the predetermined second base period has passed, it is determined whether a predetermined period for the aging experiment has passed or not (S210).

The predetermined period for the aging experiment may be about 100 hours.

If the predetermined period has not passed for the aging experiment in step S210, it is returned to step S203 and repeats the processes that are explained above.

According to the repetitions of the processes stated above, phosphor (P) and zinc (Zn) that are included in the oil additive or the engine oil mixture in which the engine oil and the oil additive are mixed are supplied to the intake line 2 through the first valve 14, and the first catalytic converter 6 and the second catalytic converter 8 are thereby poisoned, so aging experimental results that are almost identical to the driving conditions of the real vehicle are detected.

If the predetermined total aging period has passed in step S210, the end of the aging experiment occurs (S211), and development and design of the catalytic converter can be accomplished by analyzing results that are collected through the experiment according to the exhaust amount of the engine 10 (S212).

AN EXEMPLARY EMBODIMENT

An exemplary method of performing the aging experiment at a high temperature for a catalytic converter that can be applied to a small engine of 1500 cc for a predetermined period of 100 hours is hereinafter explained by using the catalytic converter aging method according to the present invention.

According to the start of the aging experiment, a contamination material is injected into the intake line 2, wherein the contamination material may include the oil additive or the engine oil mixture in which the engine oil and the oil additive are mixed, and the material is pressurized and transferred to the pump 12 through the first valve 14.

The mixing ratio of the contamination material that is injected into the intake line 2 is engine-oil to oil-additive at approximately 30:1 by weight ratio, wherein the injection amount is 1200 cc, so the catalytic poisoning or contamination occurs by the engine oil in the catalytic converter.

In this condition the engine 10 is operated at an approximate 14.7:1 air/fuel ratio and the temperature of the first catalytic converter 6 and the second catalytic converter 8 is sustained around 780° C. for about 60 sec.

Further, the engine 10 is operated in a rich fuel condition of lower than an approximate 13:1 air/fuel ratio, then air is injected into the exhaust pipe 4 through the second valve 16. The unburned fuel in the engine 10 combusts with the air in the first catalytic converter 6 and the second catalytic converter 8, so the temperature of the first catalytic converter 6 and the second catalytic converter 8 increases to as high as around 1015° C. for 20 sec. As a result, the performance of the catalytic converter is deteriorated.

The performance that is stated above is repeated for 100 hours at a high temperature.

Comparative Example 1

A catalytic converter having identical specifications to the catalytic converter of the said exemplary embodiment is disposed in a real vehicle, then the real vehicle travels 160,000 Km of the usable lifespan that the domestic Korean laws stipulate, and the aging results are obtained in Comparative Example 1.

Comparative Example 2

Comparative Example 2 applies the method for aging the catalytic converter for 100 hours by only using the temperature aging step that is operated in a conventional bench state of the engine.

The engine 10 is operated at an approximate 14.7:1 air/fuel ratio according to start of the aging, so the temperature of the first catalytic converter 6 and the second catalytic converter 8 is sustained about 780° C. for 45 sec. Then the engine 10 is operated in a rich fuel condition of lower than an approximate 13:1 air/fuel ratio and air is injected through the second valve 16. The unburned fuel that is included in the exhaust gas reacts with the air and combusts in the first catalytic converter 6 and the second catalytic converter 8.

Accordingly, the temperature of the first catalytic converter 6 and the second catalytic converter 8 increases up to 1015° C. and this condition continues for about 20 sec.

This aging process at the high temperature is repeated for 100 hours which is the period of the predetermined aging experiment.

The following Table 1 shows the experimental results that compare the exemplary embodiment according to the present invention with the comparative examples.

As a reference, the aged exhaust system (catalytic converter) is equipped in the vehicle according to the exemplary embodiment in the present invention and Comparative example 1 and 2, and the purifying performance of the exhaust gas that is passed through the catalytic converter is measured based on a driving condition of a domestic official assessment mode.

TABLE 1

|  | THC (g/km) | NOx (g/km) | P Content (%) |
|---|---|---|---|
| Exemplary Embodiment | 0.037 | 0.130 | 2.5 |
| Comparative Example 1 | 0.045 | 0.180 | 4.0 |
| Comparative Example 2 | 0.032 | 0.0035 | 0.2 |

As shown in Table 1, the exemplary embodiment according to the present invention most coincides with a real condition of the vehicle of Comparative Example 1 under real conditions.

However, the exhaust concentration of nitrogen oxide can be very low in Comparative Example 2 only using the conventional high temperature aging method compared with Comparative Example 1.

Also, among the aged catalytic converters in the exemplary embodiment according to the present invention and Comparative Examples 1 and 2, the first catalytic converter is incised, and the amount of the attached phosphor (P) therein is detected by an induction union plasma device.

As shown in the analysis results, distribution of phosphor in the exemplary embodiment according to the present invention is very similar to the same of Comparative Example 1 under real conditions of the vehicle.

That is, the aging in catalytic poisoning or contamination condition by the oil occurs similar to that of a real vehicle.

However, the aging in catalytic poisoning or contamination condition by the oil hardly occurs in Comparative Example 2, so the amount of attachment of phosphor (P) is small.

For convenience in explanation and accurate definition in the appended claims, the terms "upper" or "lower", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An aging device of a catalytic converter of a vehicle, comprising:
    an engine for bench testing;
    a first valve through which an oil additive or an engine oil mixture is injected into the engine, the first valve disposed in an intake line through which intake air flows;
    a pump that pressurizes and transmits the oil additive or the engine oil mixture from a storage tank to the first valve;
    a catalytic converter that is disposed in an exhaust pipe through which exhaust gas that is combusted in the engine is exhausted out of the engine;
    a second valve through which atmospheric air is introduced so as to produce a secondary combustion of unburned exhaust gas, the second valve disposed in the exhaust pipe upstream of the catalytic converter; and
    a control apparatus that operates thermal and contamination aging of the catalytic converter in a bench test state of the engine under conditions that simulates the operational state of a vehicle.

2. The aging device of a catalytic converter of a vehicle of claim 1, wherein the control apparatus supplies the intake line with a predetermined amount of contamination material by controlling supply pressure of a pump and opening the first valve, and supplies the catalytic converter with air by controlling opening of the second valve under a severe operating condition of the engine.

3. The aging device of a catalytic converter of a vehicle of claim 1, wherein the control apparatus:
    supplies the intake line with a predetermined amount of contamination material through the first valve and holds the temperature of the catalytic converter to less than 900° C. for 60 seconds by operating the engine with an air/fuel ratio of approximately 17:1; and
    drives the engine with an air/fuel ratio of approximately 14.7:1 and holds the temperature of the catalytic converter to higher than 900° C. for 20 seconds through combustion of the unburned exhaust gas by flowing air to the catalytic converter through the second valve.

4. The aging device of a catalytic converter of a vehicle of claim 1, wherein the engine oil mixture that is injected into the intake line through the first valve is a mixture of commercial engine oil in which amounts of phosphor and zinc are respectively about 1000 ppm, and an oil additive of ZDDP (zinc dialkyldithiophosphate) or ZDTP (zinc dithiophosphate) in which amounts of phosphor and zinc are greater than about 1000 ppm.

5. The aging device of a catalytic converter of a vehicle of claim 1, wherein an injection amount and a mixture ratio of the oil additive and the engine oil mixture injected into the intake line through the first valve are adjusted according to an exhaust amount thereof during bench testing.

6. The aging device of a catalytic converter of a vehicle of claim 1, wherein the oil additive injected into the intake line through the first valve includes zinc dialkyldithiophosphate (ZDDP) and/or zinc dithiophosphate (ZDTP) having amounts of phosphor and zinc, which amounts being higher than those of commercial engine oil.

7. The aging device of a catalytic converter of a vehicle of claim 1, wherein the amount of the oil additive or the amount of engine oil mixture that is injected into the intake line through the first valve, is based upon the amount of engine oil that is consumed according to a general operational state of a vehicle.

8. The aging device of a catalytic converter of a vehicle of claim 1, wherein unburned exhaust gas is combusted in the catalytic converter by air that is injected through the second valve to increase the temperature of the catalytic converter to simulate a severe operating condition of the engine.

9. The aging device of a catalytic converter of a vehicle of claim 1, wherein the control apparatus simultaneously performs the thermal and contamination aging so as to age the catalytic converter under conditions that simulate those of a real vehicle by supplying the intake line with a contamination material and controlling the engine under normal and severe conditions.

10. The aging device of a catalytic converter of a vehicle of claim 9, wherein normal operating conditions of the engine provide a theoretical air/fuel ratio for normal combustion and severe operating conditions of the engine provide a rich air/fuel ratio in which the amount of unburned exhaust gas is increased.

11. An aging device of a catalytic converter of a vehicle, the aging device including an engine for bench testing, the aging device further comprising:
    a first valve that supplies an air-intake line with a contamination material;
    a catalytic converter disposed in an exhaust pipe through which exhaust gas flows from the engine;
    a second valve through which atmospheric air flows into the exhaust pipe upstream from the catalytic converter; and
    a controller for controlling the engine, the first valve, and the second valve to perform thermal aging and contamination aging of the catalytic converter,
    wherein a contamination material injected into the intake line through the first valve includes an engine oil mixture of a commercial engine oil and/or an oil additive.

12. The aging device of a catalytic converter of a vehicle of claim 11, wherein a pump that is operated by a control signal of the controller pressurizes and transmits a contamination material that is injected into the intake line through the first valve from a storage tank.

13. The aging device of a catalytic converter of a vehicle of claim 11, wherein a contamination material injected into the air-intake line through the first valve is ZDDP or ZDTP containing an amount of phosphor and/or zinc that is higher than in commercial engine oil.

14. The aging device of a catalytic converter of a vehicle of claim 11, wherein an amount and a mixture ratio of the contamination material are based upon an exhaust amount of the engine, and the amount of the contamination material corresponds to an amount of contamination material in engine oil that is consumed by a real vehicle.

15. The aging device of a catalytic converter of a vehicle of claim 11, wherein the controller is configured to sustain the temperature of the catalytic converter lower than a base temperature by operating the engine under a first air/fuel ratio, to hold the temperature of the catalytic converter higher than the base temperature for a predetermined time period by providing a secondary air to the catalytic converter through the second valve such that the unburned gas combusts, to operate the engine under a second air/fuel ratio for another predetermined period, and to repeat above steps to perform an aging experiment.

16. A method for aging a catalytic converter of a vehicle, comprising:
    a first process that injects contamination material into an engine to simulate aging of a catalytic converter;
    a second process that operates the engine under a first air/fuel ratio;
    a third process that holds the temperature of the catalytic converter lower than a base temperature for a predetermined period;
    a fourth process that operates the engine under a second air/fuel ratio;
    a fifth process that holds a high temperature of the catalytic converter higher than the base temperature for another predetermined period by supplying air to the catalytic converter; and
    a sixth process that determines whether a predetermined period in an experiment has passed, and repeatedly operates the second, third and fourth processes when the predetermined period has not passed.

17. The method for aging a catalytic converter of a vehicle of claim 16, wherein the contamination material that is injected into the engine is at least one of an oil additive or an engine oil mixture.

18. The method for aging a catalytic converter of a vehicle of claim 16, wherein the contamination material that is injected into the engine is an oil additive having an amount of phosphor and/or zinc that is higher than that of a commercial engine oil.

19. The method for aging a catalytic converter of a vehicle of claim 16, wherein the amount of the contamination material that is injected into the engine in the first process corresponds to an amount of engine oil that is typically consumed by a real vehicle.

20. The method for aging a catalytic converter of a vehicle of claim 16, wherein the first air/fuel ratio is approximately 17.0:1.

21. The method for aging a catalytic converter of a vehicle of claim 16, wherein a first air/fuel ratio corresponds to a normal driving condition.

22. The method for aging a catalytic converter of a vehicle of claim 16, wherein the base temperature of the catalytic converter is approximately 900° C.

23. The method for aging a catalytic converter of a vehicle of claim 16, wherein the second air/fuel ratio is approximately 14.7:1.

24. The method for aging a catalytic converter of a vehicle of claim 16, wherein the second air/fuel ratio corresponds with a severe driving condition in which a rich fuel mixture is supplied to the engine.

25. The method for aging a catalytic converter of a vehicle of claim 16, wherein air that is supplied to the catalytic converter reacts with unburned exhaust gas to combust inside the catalytic converter and increase the temperature of the catalytic converter to about 1015° C.

26. The method for aging a catalytic converter of a vehicle of claim 16, wherein the contamination material is an engine oil mixture of which an engine oil and an oil additive are mixed in a predetermined ratio.

27. The method for aging a catalytic converter of a vehicle of claim 26, wherein the amount and mixture ratio of the contamination material that is injected into the engine is determined based on an exhaust amount of the engine in the first process.

28. A method for aging a catalytic converter through engine bench tests, the method comprising:
    (a) a supplying process that supplies a contamination material through an intake line, the amount of contamination material based upon exhaust amount and durability of the engine;
    (b) an aging process that ages the catalytic converter for a predetermined period under normal driving conditions by operating the engine under a theoretical air/fuel ratio; and
    (c) an aging process that ages the catalytic converter for a predetermined period under severe driving conditions by operating the engine under a rich fuel condition,
    wherein the aging processes are repeatedly and alternatively performed under normal driving conditions and under severe driving conditions for a predetermined experimental period.

* * * * *